United States Patent [19]
Doty

[11] Patent Number: 4,997,140
[45] Date of Patent: Mar. 5, 1991

[54] RETRACTOR WITH AUXILIARY BRAKE MECHANISM
[75] Inventor: Gerald A. Doty, Crown Point, Ind.
[73] Assignee: Occupant Safety Systems Inc., Olympia Fields, Ill.
[21] Appl. No.: 341,440
[22] Filed: Apr. 21, 1989
[51] Int. Cl.⁵ .......................................... B65H 75/48
[52] U.S. Cl. ......................... 242/107.2; 242/107.40 A
[58] Field of Search .................. 242/107.2, 107.4 R, 242/107.4 A, 107.4 B, 107.4 C, 107.4 D, 107.4 E; 280/806; 297/478, 480

[56] References Cited

U.S. PATENT DOCUMENTS

| Re. 30,707 | 8/1981 | Adomeit | 242/107.2 |
|---|---|---|---|
| 3,375,994 | 4/1968 | Wohlert et al. | 242/107.2 |
| 3,467,337 | 9/1969 | Putman | 242/107.4 |
| 4,306,735 | 12/1981 | Pfeiffer et al. | 280/807 |
| 4,383,659 | 5/1983 | Okabe | 242/107.2 |
| 4,394,034 | 7/1983 | Murphy et al. | 280/801 |
| 4,399,956 | 8/1983 | Mita | 242/107.2 |
| 4,437,623 | 3/1984 | Wyder | 242/107.2 |
| 4,451,062 | 5/1984 | Ziv | 280/806 |
| 4,492,348 | 1/1985 | Ziv et al. | 242/107.2 |
| 4,544,112 | 10/1985 | Ziv | 242/107.2 |
| 4,597,545 | 7/1986 | Burghardt | 242/107.7 |
| 4,687,253 | 8/1987 | Ernst et al. | 297/487 |

Primary Examiner—Joseph J. Hail, III
Attorney, Agent, or Firm—Fitch, Even, Tabin & Flannery

[57] ABSTRACT

A safety belt retractor in which the reel is supported on a movable frame which cooperates with a braking mechanism such that when the reel locks, subsequent belt tension displaces the movable frame into camming engagement with a pivoting braking mechanism to shift a brake shoe into direct contact with the belt web. The brake shoe is supported on the braking mechanism for movement relative thereto. The brake shoe and its mounting portions preferably have complementary interfitting bearing surfaces which share a common axis of curvature, with the bearing surface on the brake shoe being convex, and the complementary surface on the cam being concave.

9 Claims, 2 Drawing Sheets

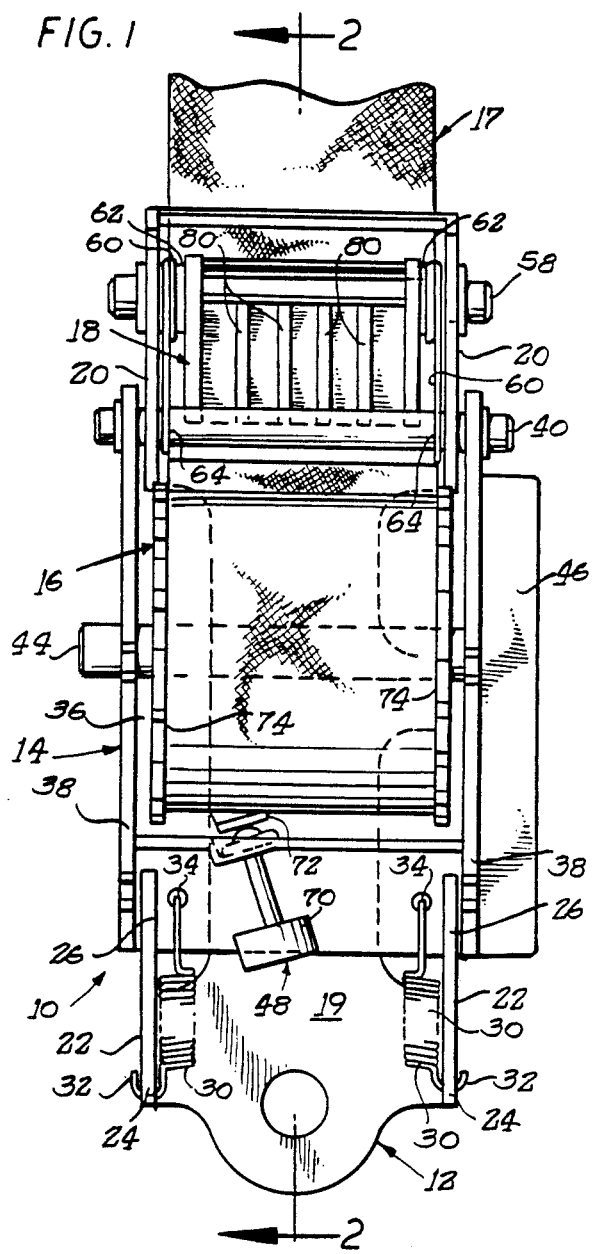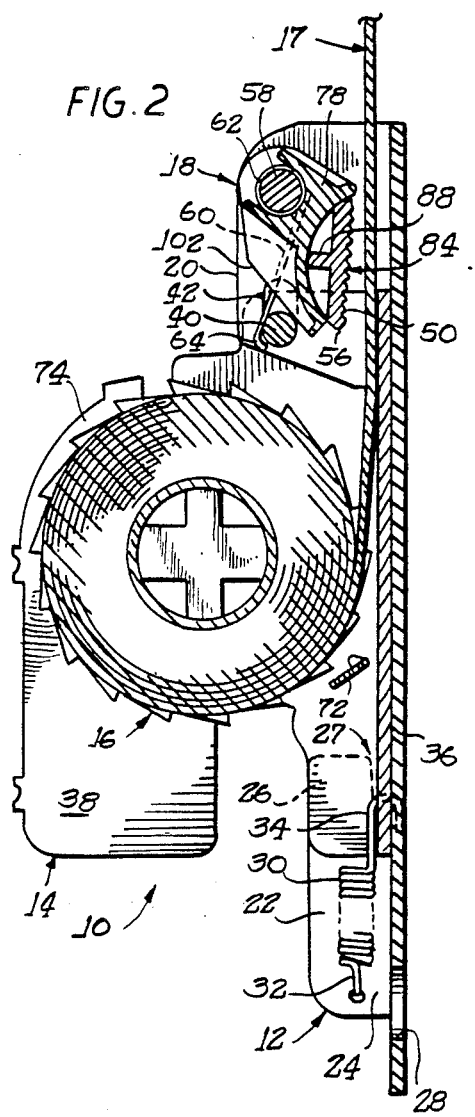

FIG.3
FIG.4
FIG.5

RETRACTOR WITH AUXILIARY BRAKE MECHANISM

BACKGROUND OF THE INVENTION

The invention relates generally to a safety belt retractor, and more particularly to a safety belt retractor having a brake mechanism which acts directly on the belt and operates in conjunction with a reel-locking mechanism.

A typical safety belt retractor includes a spring-biased reel on which a length of safety belt webbing is wound, and an inertial reel-locking mechanism which locks the reel against rotation to prevent protraction of the webbing in the event of a situation where passenger restraint is needed. Locking of the reel does not necessarily preclude any further protraction of the belt, because the webbing may cinch on the reel when under high tension. Several proposals for improved retractors provide for a mechanism which clamps or grips the webbing directly to stop protraction, either in conjunction with or instead of the reel locking mechanism. While such clamping arrangements may provide improved control over belt protraction, they also present certain problems.

One problem is that the gripping or clamping mechanism must engage the webbing securely enough to arrest its movement while the webbing is subjected to a high tensile load, without damaging the webbing. The tensile load on the belt may greatly exceed the weight of the passenger in the event of a collision. To meet manufacturing standards, the clamping mechanism must be capable of repeatedly constraining the belt against tensile loads of about 1600 lbs. without damage to the belt. A mechanism which causes fraying or other damage to the belt webbing is unacceptable even if it is otherwise effective.

A relatively early proposal for a clamping device is set forth in U.S. Pat. No. 3,467,337. As disclosed at column 4, line 15 et seq., and shown in FIG. 2, the clamp 60 in this patent has a curved edge 78 which engages the belt 29. This clamping mechanism illustrates one general approach to the problem of avoiding belt wear, in which the belt is engaged by a rough or toothed surface on one side, and a smooth surface on its opposite side, with the rough or toothed surface moving in the same direction as the belt during clamping, so as to reduce or eliminate movement of the rough or toothed surface relative to the belt. One disadvantage of the arrangement shown in U.S. Pat. No. 3,467,337 is that only a relatively small portion of the clamp surface area engages the belt due to its curvature. This may result in unacceptable stress concentrations on both the belt and the clamp.

Another proposed retractor with a belt-clamping mechanism is disclosed in U.S. Pat. No. 4,544,112, in which wedge-shaped members cooperate to clamp the belt. A problem with this arrangement is that the clamping mechanism jams, or reaches mechanical equilibrium, after closing on the belt, and cannot be opened merely by the force of the spring which provides rotational biasing on the reel. Accordingly, a manually operable release must be provided, which is inconvenient to the wearer.

U.S. Pat. No. 4,394,034 discloses a retractor in which a movable frame 40 supports a reel 70. When the reel locks, the frame travels upward and a clamping member 84 carried on the frame clamps or wedges the belt against abutment surfaces of a belt passage 100. This retractor relies on a wedging action to provide a mechanical advantage so as to enable high enough clamping forces to be achieved. However, it is believed that if this clamping mechanism is configured so as to provide sufficiently high clamping forces, it will be difficult to withdraw the clamping member from engagement with the belt after clamping occurs, without a manual release.

Another proposal is illustrated in U.S. Pat. No. 4,687,253, which illustrates various proposals for a clamping mechanism used in conjunction with a reel supported in elongated slots.

While various other proposals for clamping mechanisms have been made, such mechanisms often require a unique or complex retractor and complex wedges or wedging actuators which do not readily release the belt. The use of a conventional retractor operating in conjunction with a small and simple, pivoted belt-clamping or braking means operable by a cam which does not damage the belt and readily releases by itself has not heretofore been attained.

It is a general object of the invention to provide an improved safety belt retractor which includes a reliable brake mechanism that acts directly on the belt and operates in conjunction with a reel-locking mechanism.

Further objects of the invention are disclosed below.

SUMMARY OF THE INVENTION

In accordance with one aspect of the invention, there is provided a safety belt retractor which may be a conventional retractor mounted for sliding movement in a base to be fixedly mounted on the vehicle. A braking mechanism is pivotally mounted on the base, and a cam pin on the slidable retractor will cam against and pivot the braking mechanism to stop belt protraction. This action occurs when a conventional inertia-sensitive device operates to lock the reel against rotation, so that subsequent belt tension displaces the movable retractor and carries its cam pin to engage and to shift a brake shoe into direct contact with the belt webbing. The brake shoe is supported on the cam for movement relative thereto. The brake shoe and the cam preferably have complementary interfitting bearing surfaces which share a common axis of curvature, with the bearing surface on the brake shoe being convex, and the complementary surface on the cam being concave. The brake shoe preferably has a radial dimension less than the radius of curvature of its bearing surface.

The configuration of the braking mechanism may be described with reference to a first plane defined by the axis of rotation of the cam and the axis of curvature of the bearing surfaces, and a second plane defined by the belt webbing adjacent the brake shoe. The angle between the first plane and a line perpendicular to the second plane is preferably between about 19° and about 29° when the brake shoe is in its locked position. This configuration enables the braking mechanism to achieve acceptably high braking forces while being automatically releasable upon release of belt tension.

The braking surface of the brake shoe preferably employs a plurality of teeth to penetrate interstices in the webbing for positive engagement between the brake shoe and the webbing. Each of the teeth preferably has a substantially triangular transverse face for engaging the webbing, and sloping back surfaces behind the transverse face which permit the teeth to withstand relatively high belt tension to arrest protraction of the belt, without interfering with subsequent retraction of the belt following release of belt tension.

Further aspects of the invention are disclosed in the description and claims are set forth below, and in the accompanying drawings.

BRIEF DESCRIPTION OF THE DRAWINGS

FIG. 1 is a front elevational view of a retractor in accordance with the invention.

FIG. 2 is a side elevational view of the retractor of FIG. 1.

FIG. 3 is an enlarged front elevational view of the braking mechanism of the retractor of FIG. 1.

FIG. 4 is an enlarged side elevational view of the braking mechanism of the retractor of FIG. 1, shown with the braking mechanism in its braking position.

FIG. 5 is an enlarged side elevational view similar to that of FIG. 4, but showing the braking mechanism in its inactive position.

DETAILED DESCRIPTION OF PREFERRED EMBODIMENT

The invention is generally embodied in a safety belt retractor 10 comprising a fixed base 12, a frame 14 slidably supported on the base 12, a reel 16 rotatably supported on the frame with a length of webbing 17 wound thereon, and a belt-engaging mechanism or braking mechanism 18.

The base has a back wall 19 which is adapted to be affixed to a supporting surface on the vehicle, e.g., the vehicle door frame. To support and constrain the braking mechanism 18 and the movable frame, upper and lower pairs of side members 20 and 22, respectively, are disposed generally perpendicular to the back wall 19 of the base 12, on opposite sides thereof, extending away from the support surface. The lower side members 22 are generally L-shaped, each having a lower portion 24 connected to the back wall of the base and an upper portion 26 extending upward therefrom so as to define a slot 27 between the upper portion 26 and the back wall 19 for slidably receiving a lower portion of the frame 14 as described below. The base 12 has a circular opening 28 near the lower end of the back wall to receive a bolt or the like to secure the base to the frame.

Figures 3, 4, 5:
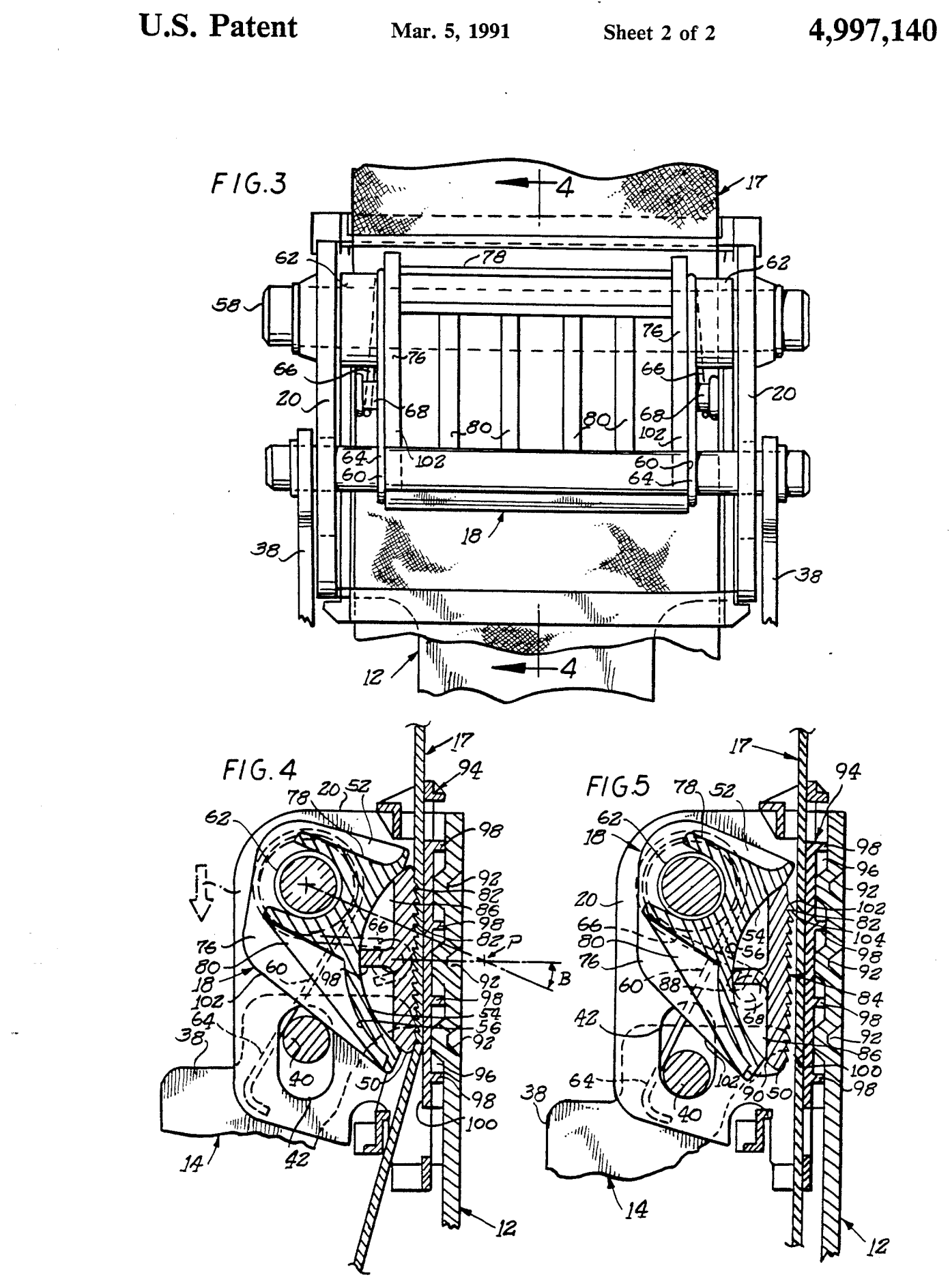

The frame 14 is movable between a lower position (shown in FIGS. 1 and 2) corresponding to normal operation and an upper position (FIG. 4) corresponding to emergency locking of the retractor 10. The frame 14 is biased toward its lower position by a pair of coil springs 30 loaded in tension. The springs 30 have their lower ends 32 affixed to lower portions of the lower side members 22 of the base 12, and have their upper ends 34 affixed to the frame.

The frame 14 preferably comprises a back wall 36 which slides against the back wall 19 of the base, and a pair of sidewalls 38 which extend outward from the back wall 36 to support the reel 16. The frame 14 is constrained for rectilinear vertical travel relative to the base 12. The lower portion of the back wall of the frame is received in the slots 27 defined by the lower side members 22 and back wall 19 of the base 12. The lower end of the frame 14 is maintained centered by abutting sliding engagement between the sidewalls 38 of the frame and the lower side members 22 of the base 12. The upper end of the frame 14 is similarly constrained by engagement between the upper portions of the frame sidewalls 38 and the upper side members 20 of the base, and by a pin 40 which extends between the sidewalls 38 of the frame 14 through a pair of vertically-elongated slots 42 in the upper side members 20 of the base. In addition to constraining the frame 14 relative to the base 12, the pin 40 performs a camming function in the braking mechanism as described below.

The reel 16 is supported on a shaft 44 which extends through the opposite sidewalls of the frame. A conventional spirally-wound spring assembly 46 is provided at one end of the shaft to bias the reel 16 for retraction. A conventional reel-locking mechanism 48 is used to lock the reel 16 in response to rapid acceleration of the vehicle in any direction, or upset of the vehicle. The reel-locking mechanism employs an inertia-sensitive weight 70 to pivot a locking pawl 72 into engagement with ratchet wheels 74 when the retractor experiences high acceleration or displacement from its normal orientation. A reel-sensitive inertia means may be attached to the reel shaft to stop further shaft rotation at a predetermined rotational velocity for the reel. The preferred seat belt retractor is a commonly used and conventional retractor to which is added the braking mechanism and the base on which the conventional retractor is mounted. The camming pin 40 is added to the conventional retractor.

The webbing brake 18 is supported between the upper side members 20 of the base 12 and is movable between an inactive position in which the webbing 17 can move freely, and a braking position in which the webbing 17 is constrained against protraction by engagement with a brake shoe 50.

In accordance with a feature of the invention, the brake shoe 50 is supported by a pivoting cam 52 which is normally biased away from the webbing 17, but which is cammed to bring the brake shoe 50 into engagement with the webbing 17 by the pin 40 upon upward travel of the frame 14. The cam has a concave, part-cylindrical bearing surface 54 for receiving the brake shoe 50, which has a complementary, part-cylindrical convex bearing surface 56 on its back.

The cam 52 is supported on the pivot pin 58 by cylindrical collars 62 which extend outward on opposite sides thereof. The pin 58 extends through the upper side members 20 of the base 12, and is biased away from the webbing surface by a pair of springs 60. The springs 60 are looped around the collars 62 on the opposite sides of the cam. Each spring has a lower leg 64 extending down and away from the back of the base to engage the camming pin, and an upper leg 66 with a hook at its end engaging a trunnion 68 on the cam 52. The springs bias the cam 52 in a clockwise direction as viewed in FIGS. 2, 4 and 5, while also maintaining the brake shoe 50 in contact with the cam 52. The bearing surface 54 of the cam 52 is backed by a pair of longitudinally-extending sidewalls 76, a trough-shaped transverse stiffener 78, and a plurality of longitudinally-extending gussets 80.

To provide for positive, non-sliding contact between the brake shoe 50 and the webbing 17 with minimal wear on the webbing, the brake shoe 50 has a braking surface 84 composed of a plurality of pointed teeth 82. The points of the teeth 82 are substantially coplanar so that the entire braking surface, i.e., all of the teeth 82, can engage the webbing 17 to distribute braking loads over a large area.

In one embodiment, the braking surface 84 is generally rectangular with a longitudinal or vertical dimension of about 1 in. and a transverse dimension of about 2 in. The transverse or radial dimension of the brake shoe, i.e., its maximum dimension perpendicular to the braking surface, is about 5/16 in. The bearing surfaces 54 and 56 on the cam 52 and brake shoe 50 preferably each have a radius of curvature about a transverse axis P (FIG. 4) of about ⅜ in. Because the radius of curvature is greater than the transverse or radial dimension of the brake shoe 50, and specifically is about twice the transverse dimension of the brake shoe, the brake shoe 50 travels slightly upward and rotates slightly clockwise relative to the cam during braking after initially engaging the belt. This facilitates achievement of smooth braking action and relatively even distribution of braking forces, contributing to effective braking without damage to the webbing 17.

The bearing surface 56 on the brake shoe is made up of a plurality of longitudinally-extending ribs 86 connected by a central transverse rib 88. The brake shoe 50 is preferably a one-piece plastic molding. To maintain the brake shoe 50 centered on the cam 52, guide lugs 90 are provided on opposite sides of the brake shoe near the lower end, engaging the sides of the cam 52.

To prevent deformation of the back wall 19 of the base 12 upon application of braking forces thereto, a plurality of transverse ribs 92 are provided to stiffen the back wall 19 and distribute braking forces. The forces applied are quite high and the center portion of the back wall tends to deflect, and, if allowed to deflect, causes the braking surface to concentrate the forces on the outer longitudinal edges of the belt to an extent that the belt is damaged. By using thick metal for the back wall and heavy, large ribs 92, this problem is overcome. To keep the webbing 17 flat adjacent the brake shoe 50 and spaced from the brake shoe during normal conditions, and to provide a smooth, generally planar support surface for engaging the side of the webbing 17 opposite the brake shoe, a plastic web guide 94 is supported between the upper side members 20 of the base, between the back wall 19 of the base 12 and the brake shoe 50. The web guide 94 has contoured longitudinal ribs 96 abutting and interfitting with the transverse ribs in the back of the base 12 to distribute braking forces. Spacing between the webbing 17 and the brake shoe 50 is maintained by transverse members 98 which cooperate with the smooth, planar support surface 100 to define slots through which the webbing 17 passes.

In normal operation of the retractor 10, the frame 14 remains in its lower position. The webbing 17 is protracted when the wearer uses the belt, and is subsequently retracted by the spring assembly 46. When the vehicle experiences rapid acceleration or deceleration, or is upset, the reel-locking mechanism 48 locks the reel 16 against protraction. Subsequent tension on the belt, due to movement of the wearer of the belt relative to the interior of the vehicle, pulls the frame 14 upward. As the frame 14 travels upward, the camming pin 40 slides along the edges 102 of the sidewalls of the cam 52, pivoting the cam 52 in a counterclockwise direction toward its braking position.

The edges 102 are disposed at an angle of about 40° to the plane of the web support surface 100, when the web brake is in open position (FIG. 5), and at an angle of about 50° in closed position (FIG.4). As the frame 14 travels upward, the camming pin 40 travels substantially parallel to the plane of the web support surface 100, directly toward the axis of the pivot pin 58.

When the brake shoe 50 makes contact with the web 17, points of the teeth 82 penetrate interstices in the web 17. The teeth 82 have sloped upper surfaces 104 and flat, transverse lower surfaces 106 to engage the fibers of the web. The brake shoe 50 continues to travel upward for a short distance with the web 17, rotating clockwise about axis P relative to the cam 52, as the cam 52 continues to rotate counterclockwise relative to the base 12. Mechanical equilibrium is then reached in the braking position as shown in FIG. 4.

After tension on the belt has been released, the cam 52 must pivot back to the position shown in FIG. 5 to permit normal retraction and protraction of the belt for further use. As noted above, some prior retractors employ a clamping or braking mechanism which stays in the locked or clamped position after belt tension is released, and must be shifted manually to its unlocked or open position. One of the problems addressed by the braking mechanism is the provision of sufficiently high braking forces without the use of a mechanism which requires manual resetting after use. Basically, this requires that the static frictional forces resisting retraction of the belt after braking be minimal. If the static frictional forces are too high, jamming occurs, such that the braking mechanism will not return to its unlocked position. The problem is solved by the illustrated braking mechanism as explained below.

Referring to FIG. 4, the center of curvature or axis of the recess on the cam 52 is indicated at point P. The line extending through point P and through the center of rotation about which the cam 52 pivots is labeled $l_1$. The line through the center of curvature P extending perpendicular to the plane of the web is labeled $l_2$. The included angle between lines $l_1$ and $l_2$ is designated $\beta$.

Susceptibility to jamming is largely dependent on the value of the angle $\beta$ when the braking mechanism is in locked position. As $\beta$ approaches zero, susceptibility to jamming increases. However, as $\beta$ increases, the ratio between tensile forces on the belt and normal forces decreases, resulting in decreased braking effectiveness if $\beta$ is too large.

To provide optimum performance, it has been found that $\beta$ should be between about 19° and 29°, and preferably equal to about 24°. With this configuration, when tension on the belt is released, the cam 52 is immediately pivoted to its unlocked position.

The shifting of the brake mechanism 18 to the unlocked or disengaged position is provided by the dual linear coil springs 30, the spirally-wound spring assembly 46, the dual cam return springs 60, and the weight of the frame 14, reel 16, etc. The linear coil springs 30, the spirally-wound spring assembly 46, and the weight of the reel, etc. cooperate to provide retractive forces on the web 17. The cam return springs 60 act directly on the cam to pivot it in a counter-clockwise direction.

It should be appreciated that the lower leg of the cam return springs 60 is forced in a clockwise direction, away from the web 17, as the camming pin 40 travels upward, so that the counterclockwise torque on the cam 52 exerted by the spring is maximized when the frame 14 is in its upper position.

From the foregoing, it should be appreciated that the invention provides a novel and improved safety belt retractor. In one test on a retractor in accordance with the invention, it was found that under a 1600 lb. tensile load on the belt, protraction of about 1.8 in. occurred due to cinching after locking of the retractor in the absence of the braking mechanism, whereas protraction was reduced to 0.4 in. with the braking mechanism in operation. This was accomplished without breaking or severely damaging the belt. The belt-braking retractor apparatus uses a conventional retractor and an inexpensive, simple U-shaped base on which is pivotally mounted the braking means for being cammed by a simple cam as the retractor slides on the base. The invention is not limited to the embodiment described above, nor to any particular embodiments, but is pointed out and described by the following claims.

What is claimed is:

1. A safety belt retractor comprising:
    a fixed base;
    a braking mechanism supported on the base;
    a slidable frame supported on the base for upward and downward movement and for cooperation with the braking mechanism;
    a spring-biased reel assembly supported on the slidable frame, said reel assembly including a reel supported on said slidable frame for rotation in protractive and retractive directions, and an inertial locking mechanism for selectively preventing protractive rotation of said reel;
    a belt wound on said reel and extending past said braking mechanism for selective engagement by said braking mechanism said belt comprising a length of webbing;
    said braking mechanism being movable between an inactive position in which said webbing can move freely past said braking mechanism in a longitudinal direction and a braking position in which the belt is constrained against outward movement;
    said braking mechanism including a cam pivotally supported on said base, a brake shoe movably mounted on said cam for engaging the belt, and biasing means urging said braking mechanism toward its inactive position;
    said frame having camming means thereon and being movable between a downward position corresponding to normal operation and an upward position in which said camming means engage said cam of said braking mechanism to apply braking force thereto, frame biasing means for biasing said frame toward said inward position, said camming means being operative to shift said braking mechanism from said inactive position to said braking position when said frame shifts from said downward position to said upward position;
    said camming means comprising a pin extending laterally across and supported on the slidable frame and movable vertically with the slidable frame;
    said camming means further comprising guiding surfaces on the fixed base against which the pin slides and is guided in its upward movement;
    said pin engaging said cam and pivoting the cam to bring the brake shoe into engagement with the belt;
    said pin engaging the fixed base to limit the downward movement of the slidable frame on the fixed base;
    said braking mechanism being configured such that when said cam is in said braking position, upward force on said belt pivots said cam further into said braking position and increases braking force, and inward force on said belt decreases braking force and pivots said cam toward its inactive position;
    whereby, when said frame is in said downward position and said braking mechanism is in said inactive position, tension on said belt after activation of said inertial locking mechanism results in upward travel of said frame so as to cam said braking mechanism into said braking position, and when said belt is subsequently pulled inwardly by said retractor, inward travel of said belt pivots said braking mechanism toward its inactive position sufficiently to disengage said brake shoe from said belt, and said biasing means then pivots said cam braking mechanism fully to said inactive position.

2. A safety belt retractor in accordance with claim 1 wherein said brake shoe includes on one side a generally planar but non-smooth belt-engaging surface, and on its opposite side a smooth convex bearing surface, said convex bearing surface having a radius of curvature about an axis perpendicular to the direction of travel of said belt, said cam having a complementary concave bearing surface which engages said convex bearing surface of said brake shoe and has a substantially identical radius of curvature.

3. A safety belt retractor in accordance with claim 2 wherein said brake shoe has a radial dimension less than said radius of curvature.

4. A safety belt retractor comprising:
    a fixed base having a pair of parallel side members;
    a braking mechanism supported on the base;
    a slidable reel frame supported on the base for upward and downward movement and for cooperation with the braking mechanism;
    a spring biased reel assembly supported on the slidable reel frame, said assembly including a reel supported for rotation in protractive and retractive directions, and an inertial locking mechanism for selectively preventing protractive rotation of said reel;
    a belt wound on said reel and extending past said braking mechanism for selective engagement by said braking mechanism, said belt comprising a length of webbing;
    said braking mechanism being movable between an inactive position in which said webbing can move past said braking mechanism in a longitudinal and upward direction, and a braking position in which the belt is constrained against upward movement by said mechanism;
    said braking mechanism including a cam pivotally supported on said base, a brake shoe movably mounted on said cam for engaging the belt, and biasing means urging said braking mechanism toward its inactive position;
    said reel frame having camming means thereon and being movable between a downward position corresponding to normal operation and an upward position in which said camming means engage said cam to apply braking force thereto, biasing means for biasing said frame towards said downward position, said camming means being operative to shift said braking mechanism from said inactive position to a braking position when said frame shifts from said inward position to said upward position;
    said brake shoe having a braking surface for engaging said belt;
    said fixed base having a vertically extending slot in each of its parallel side members, said slots having bottom ends;
    said camming means including a pin extending laterally across and mounted on the reel frame;
    said pin being disposed in the slots and resting on the bottom ends of the slots to stop the downward movement of the reel frame relative to the parallel side members of the fixed frame;

said pin being movable upwardly with the slidable reel frame and traveling upwardly within the slots and being guided thereby;

said pin camming the cam to the pivot and to move the brake shoe into braking engagement with the belt.

5. A retractor in accordance with claim 4 wherein said braking surface of said brake shoe comprises a plurality of teeth for penetrating said webbing.

6. A retractor in accordance with claim 4 wherein said base has a transversely ribbed surface disposed opposite said braking surface of said brake shoe to stiffen said base so as to enable said base to withstand braking forces;

said retractor further comprising a plastic insert having plastic longitudinal ribs interfitting said transverse ribs on said base, said insert having a smooth surface for engaging said belt, with said ribs being disposed between said smooth surface and said base so as to distribute braking forces and stiffen said smooth surface during braking.

7. A safety belt retractor comprising:

a U-shaped retractor frame having a pair of upstanding sidewalls joined by a central web;

a reel assembly mounted for rotation on the retractor frame for rewinding or protracting a belt wound thereon:

an inertial means on the retractor frame for selectively locking the reel against rotation and further belt protraction;

a channel-shaped base having a pair of upstanding sidewalls joined by a central web;

said web on said retractor frame being mounted in the channel-shaped base for sliding along the central web of the channel-shaped base;

said upstanding sidewalls on the base positioned adjacent the upstanding sidewalls on said retractor frame;

a cam means on the retractor frame movable with sliding movement of the retractor frame to an actuating position;

a pivotally-mounted braking means on the base actuated by said cam means to swing from an inactive position spaced from the belt to a belt-engaging position to engage and to brake the belt against further protraction; and biasing means biasing the retractor frame to slide in a direction to return the cam means from the actuating position, thereby allowing the braking means to return to its inactive position and the belt to rewind on the reel assembly;

said fixed base having a vertically extending slot in each of its parallel side members, said slots having bottom ends;

said camming means including a pin extending laterally across and mounted on the reel frame;

said pin being disposed in the slots and resting on the bottom ends of the slots to suspend the reel frame from the parallel side members of the fixed frame;

said pin being movable upwardly with the slidable reel frame and traveling upwardly within the slots and being guided thereby;

said pin camming the cam to the pivot and to move the brake shoe into braking engagement with the belt.

8. A safety belt retractor comprising:
a fixed base;
a braking means pivotally mounted on the base;
a slidable frame supported on the base for upward and downward sliding movement and for cooperation with the braking means movable from a first position to a camming position;

a spring-biased reel assembly supported on the slidable frame, said reel assembly including a reel supported on said slidable frame for rotation in protractive and retractive directions, and an inertial locking mechanism for selectively preventing protractive rotation of said reel;

a belt wound on said reel and extending past said braking means for selective engagement by said braking means, said belt comprising a length of webbing;

said braking means being pivotable between an inactive position in which said webbing can move freely past said braking means in a longitudinal direction and a braking position in which the belt is constrained against outward movement;

camming means on the frame to engage and pivot said braking means to the braking position, biasing means for biasing said frame toward said first position, said camming means being operative to shift said braking means from said inactive position to said braking position when said frame shifts from said first position to said camming position;

said camming means comprising a pin extending laterally across and supported on the slidable frame and movable vertically with the slidable frame;

said camming means further comprising a pair of guiding surfaces the fixed base against which the pin slides and is guided in its upward movement;

said pin engaging said cam and pivoting the cam to bring the brake shoe into engagement with the belt;

said braking means being configured such that when said cam is in said braking position, upward force on said belt pivots said braking means further into said braking position and increases braking force, and inward force on said belt decreases braking force and pivots said braking means toward its inactive position;

rapid deceleration of the retractor causing said inertial locking mechanism to prevent further outward travel of said belt from the reel whereby a further pull on the belt shifts the slidable frame and the cam means cams the braking means to the braking position.

9. A safety belt retractor comprising:
a fixed base;
a braking mechanism supported on the base;
a slidable frame supported on the base for cooperation with the braking mechanism;
a spring biased reel assembly supported on the slidable frame, said reel assembly including a reel supported for rotation in protractive and retractive directions, and an inertial locking mechanism for selectively preventing protractive rotation of said reel;

a belt wound on said reel and extending past said braking mechanism for selective engagement by said braking mechanism, said belt comprising a length of webbing;

said braking mechanism being movable between an inactive position in which said webbing can move past said braking mechanism in a longitudinal direction, and a braking position in which the belt is constrained against outward movement by said mechanism;

said braking mechanism including a cam pivotally supported on said base, a brake shoe movably mounted on said cam for engaging the belt, and biasing means urging said braking mechanism toward its inactive position;

said frame having camming means thereon and being movable between an inward position corresponding to normal operation and an outward position in which said camming means engage said cam to apply braking force thereto, biasing means for biasing said frame towards said inward position, said camming means being operative to shift said braking mechanism from said inactive position to a braking position when said frame shifts from said inward position to said outward position;

said brake shoe having a braking surface for engaging said belt and an opposite convex bearing surface;

said cam having a concave bearing surface interfitting with the bearing surface of said cam;

said bearing surface of said cam and said bearing surface of said brake shoe defining a common axis of curvature, said braking surface of said brake shoe comprising a plurality of teeth for penetrating said webbing, said biasing means urging said braking mechanism toward its inactive position comprising at least one spring having a first leg engaging said brake shoe and a second leg engaging said camming means on said frame;

said spring being configured such that it biases said brake shoe against said cam as well as biasing said cam toward its inactive position;

said camming means cooperating with said spring so as to displace said second leg of said spring in a direction such as to increase biasing force on said brake shoe and said cam when said frame travels toward its outward position.

* * * * *

UNITED STATES PATENT AND TRADEMARK OFFICE
CERTIFICATE OF CORRECTION

PATENT NO. : 4,997,140
DATED : March 5, 1991
INVENTOR(S) : Gerald A. Doty

It is certified that error appears in the above-identified patent and that said Letters Patent is hereby corrected as shown below:

Column 2, Line 56, after "the" (second occurrence) delete "15".

Column 8, Line 27, after "said" insert --reel--.

Column 9, Line 4, after "to" and before "pivot" delete "the".

Column 9, Line 27, after "thereon" change colon to a semicolon.

Column 9, Line 63, after "to" and before "pivot" delete "the".

Column 11, Line 11, change "towards" to --toward--.

Signed and Sealed this

Sixth Day of October, 1992

*Attest:*

DOUGLAS B. COMER

*Attesting Officer*      *Acting Commissioner of Patents and Trademarks*